US010393984B2

(12) United States Patent
Kusuda et al.

(10) Patent No.: US 10,393,984 B2
(45) Date of Patent: Aug. 27, 2019

(54) CABLE ENCLOSURE AND ELECTRONIC APPARATUS

(71) Applicant: FUJITSU LIMITED, Kawasaki-shi, Kanagawa (JP)

(72) Inventors: Kiyonori Kusuda, Kawasaki (JP); Masatoshi Yonekura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/645,388

(22) Filed: Jul. 10, 2017

(65) Prior Publication Data

US 2018/0059347 A1 Mar. 1, 2018

(30) Foreign Application Priority Data

Aug. 24, 2016 (JP) ................................ 2016-163617

(51) Int. Cl.
*G02B 6/44* (2006.01)

(52) U.S. Cl.
CPC ......... *G02B 6/4471* (2013.01); *G02B 6/4478* (2013.01); *G02B 6/4452* (2013.01); *G02B 6/4459* (2013.01)

(58) Field of Classification Search
CPC .. G02B 6/4439; G02B 6/4471; G02B 6/4477; G02B 6/4478; H01B 17/586; H01R 12/772; H01R 12/774
USPC .................................................. 385/135–137
See application file for complete search history.

(56) References Cited

U.S. PATENT DOCUMENTS 5,715,348 A * 2/1998 Falkenberg .......... G02B 6/4452 385/135
6,044,194 A * 3/2000 Meyerhoefer ....... G02B 6/4459 385/134
6,539,161 B2 * 3/2003 Holman ............... G02B 6/4452 385/136
6,809,266 B1 * 10/2004 Hoi ........................ H02G 1/085 174/135
7,000,784 B2 * 2/2006 Canty .................. G02B 6/4459 211/26
D589,782 S * 4/2009 Rowell .......................... D8/356
8,020,813 B1 * 9/2011 Clark ..................... G02B 6/445 248/74.2

(Continued)

FOREIGN PATENT DOCUMENTS

JP 63-070505 5/1988
JP 2006-237157 9/2006

*Primary Examiner* — Robert Tavlykaev
(74) *Attorney, Agent, or Firm* — Fujitsu Patent Center

(57) ABSTRACT

A cable enclosure includes a base, a cover configured to cover the base to allow a cable to be enclosed between the cover and the base, and a cable insertion opening formed between a side edge of the base and a side edge of the cover to allow the cable to be inserted therethrough, wherein the cover has a plurality of first projections projecting into the cable insertion opening from the side edge of the cover toward the base, wherein the base has a plurality of second projections projecting into the cable insertion opening from the side edge of the base toward the cover, and wherein the first projections and the second projections project in a staggered manner, such that a sum of a projecting length of the first projections and a projecting length of the second projections is longer than a gap length of the cable insertion opening.

6 Claims, 9 Drawing Sheets

(56) References Cited

U.S. PATENT DOCUMENTS

| | | | | |
|---|---|---|---|---|
| 2007/0230887 | A1* | 10/2007 | Vongseng ............ | G02B 6/4452 385/134 |
| 2015/0355412 | A1* | 12/2015 | Ray ...................... | G02B 6/4452 385/135 |

* cited by examiner

100a

CABLE ENCLOSURE AND ELECTRONIC APPARATUS

CROSS-REFERENCE TO RELATED APPLICATIONS

The present application is based upon and claims the benefit of priority from the prior Japanese Patent Application No. 2016-163617 filed on Aug. 24, 2016, with the Japanese Patent Office, the entire contents of which are incorporated herein by reference.

FIELD

The disclosures herein relate to a cable enclosure and an electronic apparatus.

BACKGROUND

An electronic apparatus connected to a plurality of cables may be provided with a cable enclosure that encloses the cables therein for the purpose of securing and protecting the cables.

For example, a cable securing apparatus known in the art includes a shelf plate member having a plurality of slits for securing cables, and also includes an opposite plate inclined to one side to resist the restoring force of the cables and having a plurality of slits for securing the cables (see Patent Document 1, for example).

Further, an optical cable treating structure known in the art has a flexible hook capable of exerting a repelling force that is inserted into and fastened at the right angle to a support member, and is mounted between the support member and a cable duct such that an optical cable is held alongside the flexible hook (see Patent Document 2, for example).

The technologies disclosed in Patent Document 1 and Patent Document 2 have a problem in that cables may easily disengage from the enclosure when the cables come in contact with each other during the work to place the cables.

PATENT DOCUMENT

[Patent Document 1] Japanese Laid-open Patent Publication No. 2006-237157

[Patent Document 2] Japanese Utility Model Publication No. 63-70505

SUMMARY

According to an aspect of the embodiment, a cable enclosure includes a base, a cover configured to cover the base to allow a cable to be enclosed between the cover and the base, and a cable insertion opening formed between a side edge of the base and a side edge of the cover to allow the cable to be inserted therethrough, wherein the cover has a plurality of first projections projecting into the cable insertion opening from the side edge of the cover toward the base, wherein the base has a plurality of second projections projecting into the cable insertion opening from the side edge of the base toward the cover, and wherein the first projections and the second projections project in a staggered manner, such that a sum of a projecting length of the first projections and a projecting length of the second projections is longer than a gap length of the cable insertion opening.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments will be described by referring to the accompanying drawings. In these drawings, the same elements are referred to by the same references, and a description thereof may be omitted.

Figure 1:
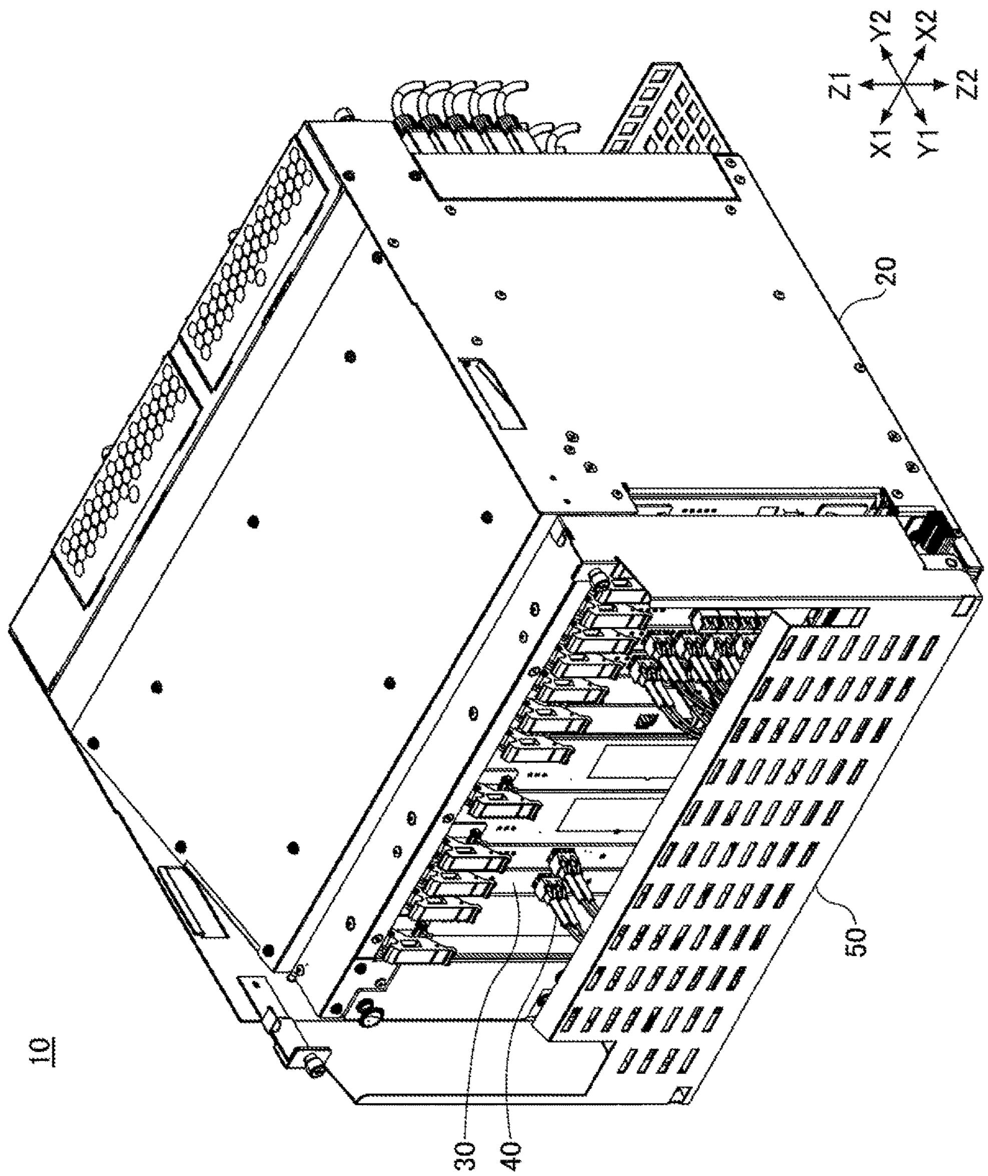
FIG. 1 is an axonometric view of a communication apparatus according to an embodiment.

FIG. 1 is an axonometric view of a communication apparatus 10 according to a present embodiment. In this and subsequent drawings, the X1-X2 direction is a width direction of the communication apparatus 10. The Y1-Y2 direction is a depth direction of the communication apparatus 10. The Z1-Z2 direction is a height direction of the communication apparatus 10.

As illustrated in FIG. 1, the communication apparatus 10 includes a shelf 20 and a cable cover 50.

The shelf 20 encloses a plurality of electric packages 30. The electric packages 30 enclosed in the shelf 20 are connected to an external apparatus through optical cables 40. The cable cover 50 is attached to the shelf 20 to protect the optical cables 40 connected to the electric packages 30.

Figure 2:
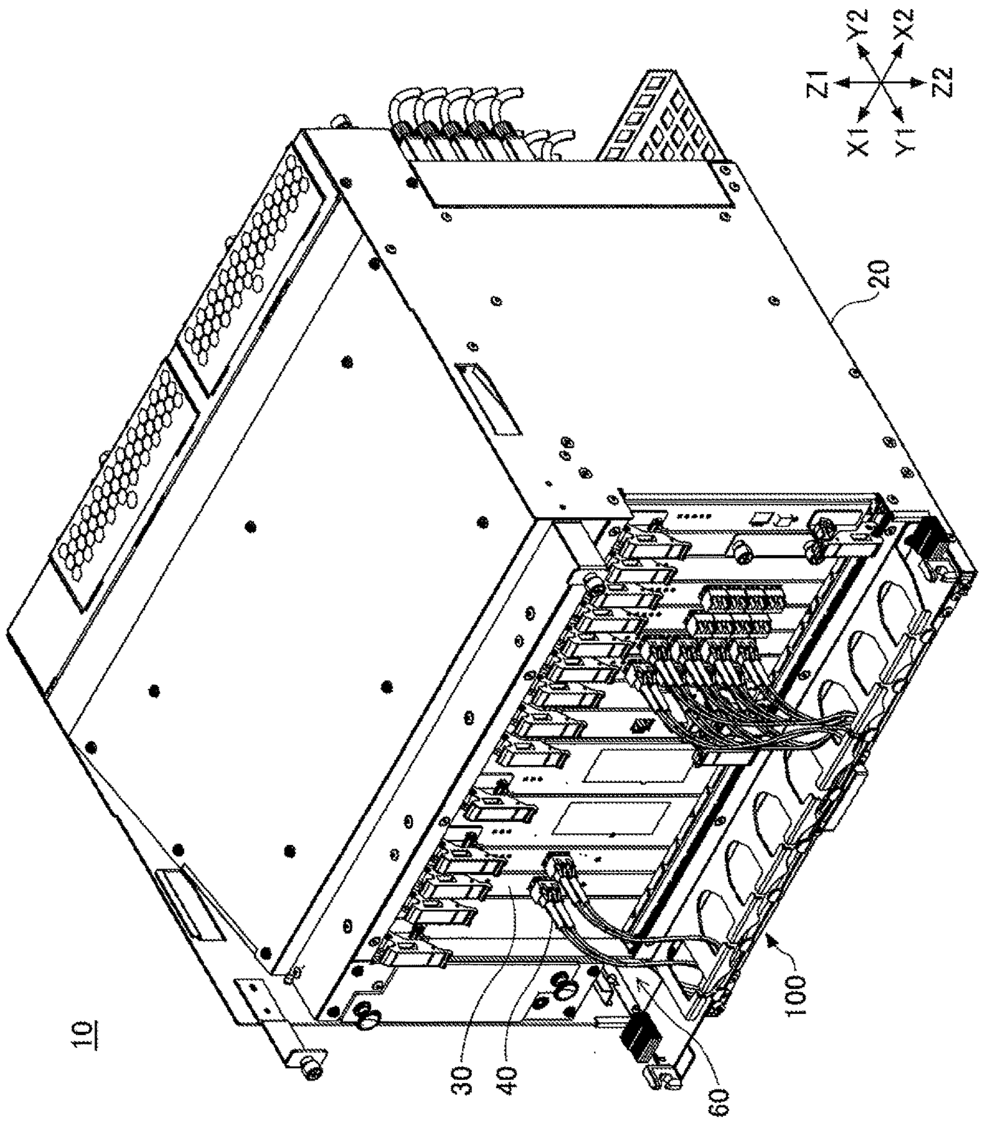
FIG. 2 is an axonometric view of the communication apparatus of the embodiment as observed after a cable cover is removed.

FIG. 2 is an axonometric view of the communication apparatus 10 of the present embodiment as observed after the cable cover 50 is removed.

The optical cables 40 connected to the electric packages 30 are at least partly enclosed in an cable enclosure 100. The optical cables 40 extend from the cable enclosure 100 to the far side of the shelf 20 through a placement opening 60 for connection to an external apparatus.

In the following, a description will be given of the cable enclosure 100 for enclosing the optical cables 40.

Figure 3:
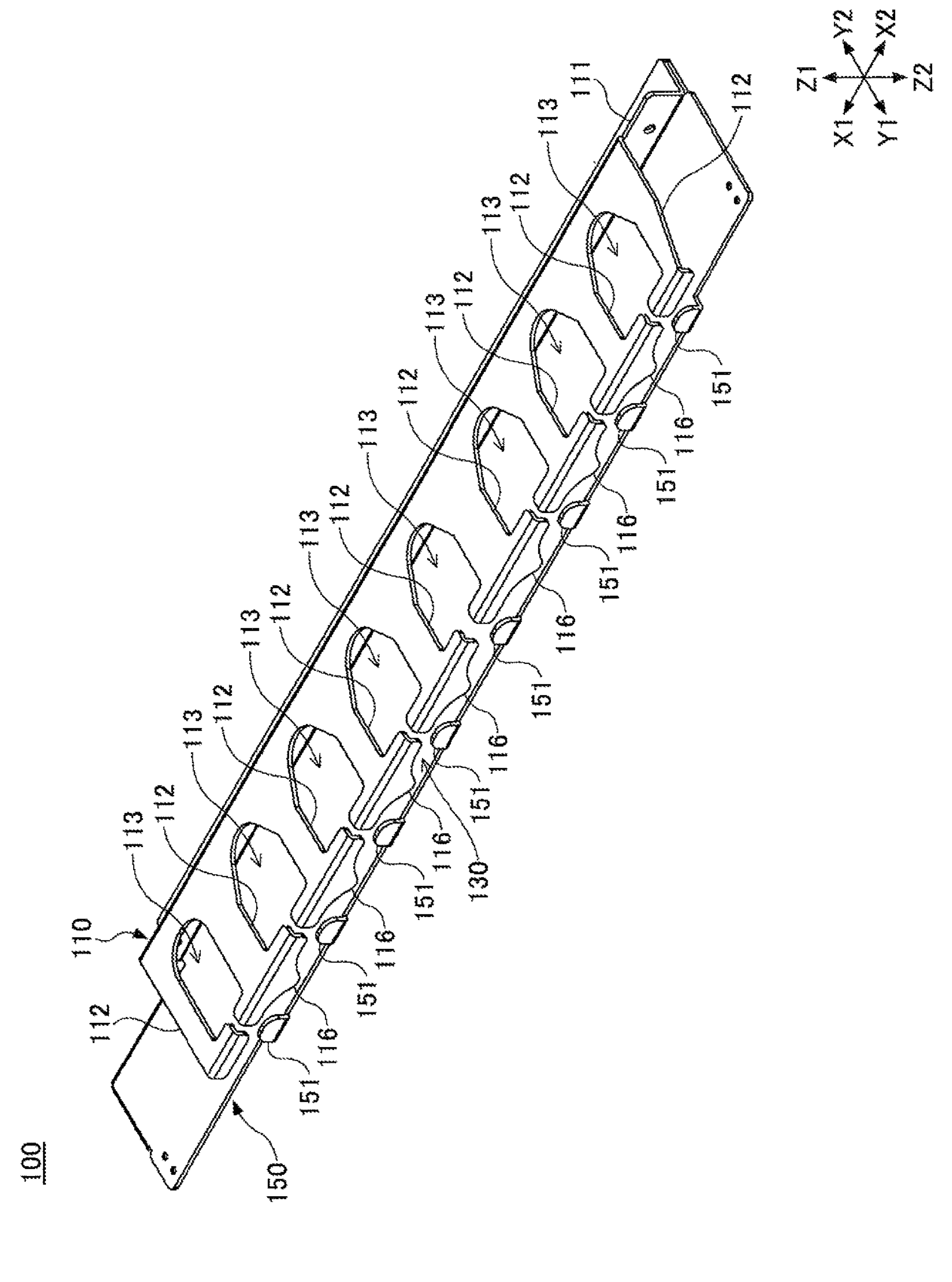
FIG. 3 is an axonometric view of a cable enclosure according to the embodiment.
Figure 4:
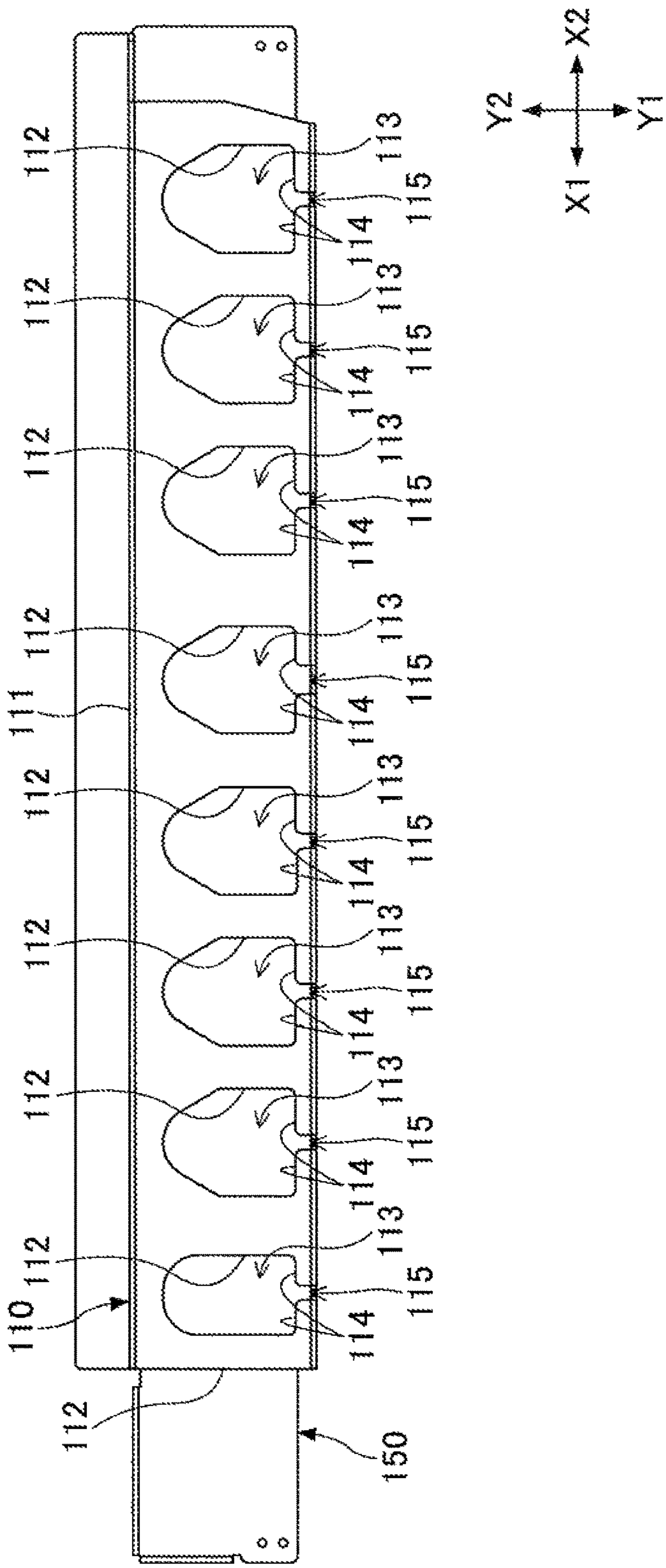
FIG. 4 is a plan view of the cable enclosure according to the embodiment.
Figure 5:
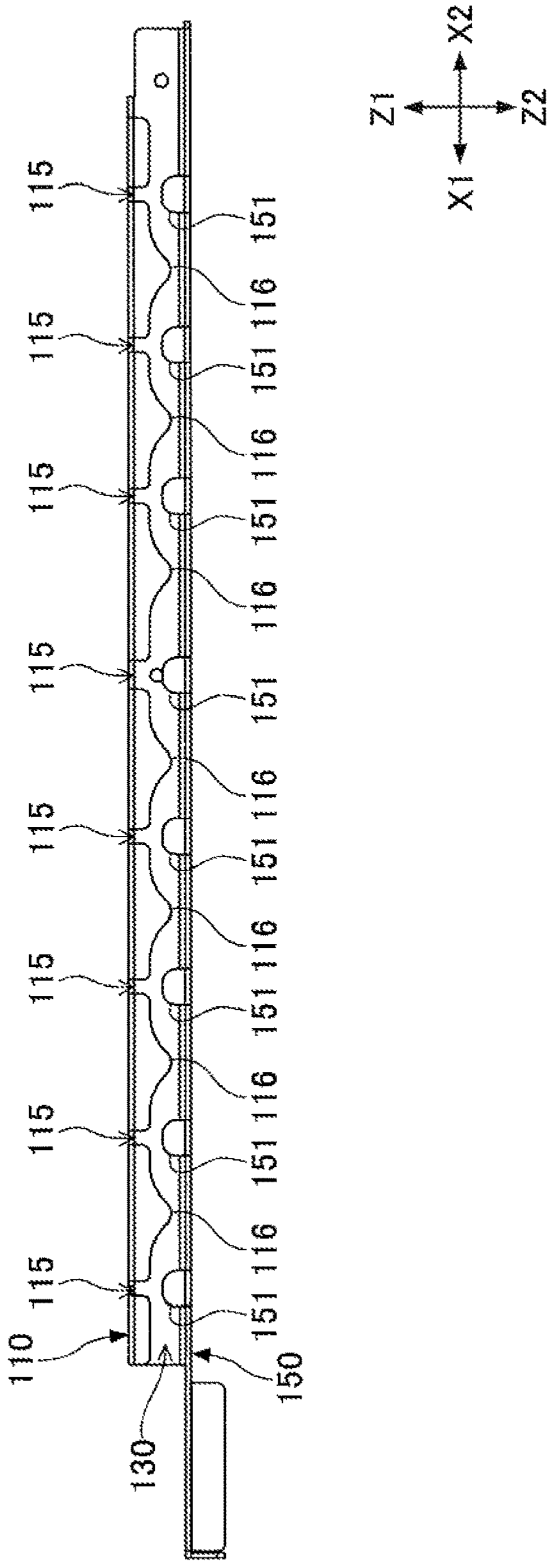
FIG. 5 is a front view of the cable enclosure according to the embodiment.
Figure 6:
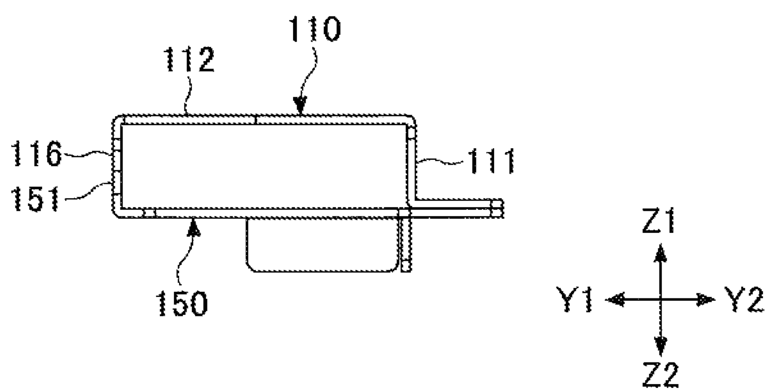
FIG. 6 is a side elevation view of the cable enclosure according to the embodiment.

FIG. 3 is an axonometric view of the cable enclosure 100 according to the present embodiment. FIG. 4 is a plan view of the cable enclosure 100. FIG. 5 is a front view of the cable enclosure 100. FIG. 6 is a side elevation view of the cable enclosure 100. In the following, the position of a cover 110 may be referred to as an upper side in the Z1-Z2 direction, and the position of a base 150 may be referred to as a lower side in the Z1-Z2 direction. Such reference is not intended to be limiting as to the mount position of the cable enclosure 100.

As illustrated from FIG. 3 to FIG. 6, the cable enclosure 100 includes the cover 110 and the base 150. The cable enclosure 100 allows the optical cables 40 to be inserted through a cable insertion opening 130 formed between a side edge of the cover 110 and a side edge of the base 150 to be enclosed between the cover 110 and the base 150. The cover 110 and the base 150 may be made from a flat metal plate by punching and bending, for example.

The cover 110 covers the base 150 to allows the optical cables 40 to be enclosed between the cover 110 and the base 150. The cover 110 includes a side wall 111 and a plurality of extending pieces 112 as illustrated in FIG. 3 through FIG. 6.

As illustrated in FIG. 3 through FIG. 6, the side wall 111 extends in the X1-X2 direction in parallel to the X-Z plane. The extending pieces 112 project from the upper end of the side wall 111 toward the Y1 direction in a comb shape, thereby forming cable extraction openings 113 therebetween.

Each of the extending pieces 112 has extending portions 114 and a first projection 116. As illustrated in FIG. 4, the extending portions 114 extend in the X1 direction and in the X2 direction, respectively, from the end of the extending piece 112 opposite the side wall 111 toward the adjacent extending portions 114. A communicating opening 115 is formed between the adjacent extending portions 114 to connect the cable extraction opening 113 with the cable insertion opening 130.

As illustrated in FIG. 3 and FIG. 5, the first projection 116 projects in the cable insertion opening 130 in the Z2 direction toward the base 150 from the end of the extending piece 112 opposite the side wall 111. The first projection 116 has an arc-shaped portion extending from the furthest projecting point in the Z2 direction to the end of either one of the extending portions 114.

The base 150 is covered with the cover 110 secured on the upper face thereof so as to allow the optical cables 40 to be enclosed between the base 150 and the cover 110. The base 150 has second projections 151 formed on the side edge thereof situated opposite the side wall 111 of the cover 110. As illustrated in FIG. 3 and FIG. 5, the second projections 151 project in the cable insertion opening 130 in the Z1 direction toward the cover 110 from the side edge of the base 150.

The first projections 116 of the cover 110 and the second projections 151 of the base 150 are staggered, i.e., alternate with each other, in the cable insertion opening 130. The second projections 151 of the base 150 are situated to face the communicating openings 115 of the cover 110, respectively.

Figure 7:
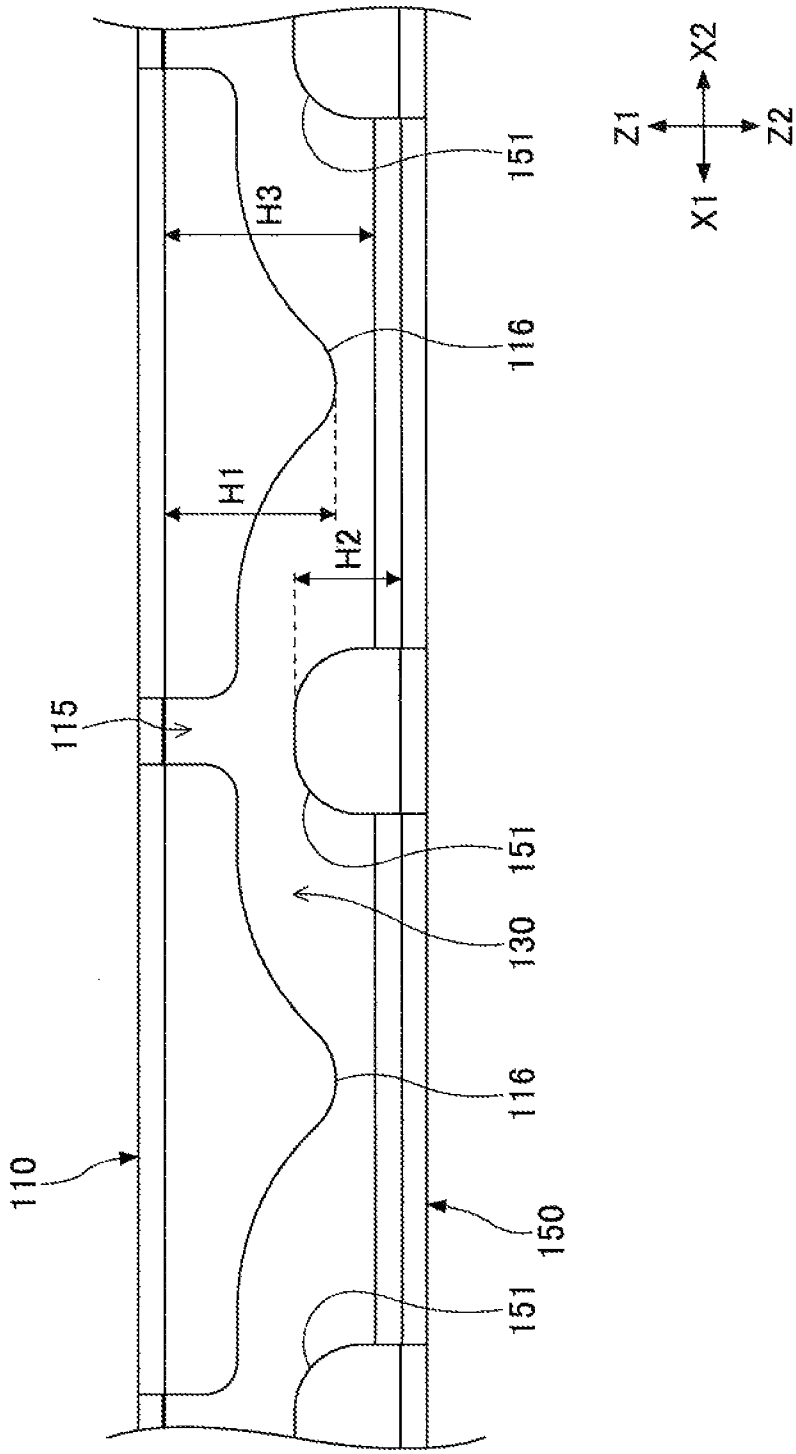
FIG. 7 is an enlarged view of part of the cable enclosure according to the embodiment.

FIG. 7 is an enlarged view of part of the cable enclosure 100 according to the present embodiment.

As is illustrated in FIG. 7, the first projections 116 and the second projections 151 are formed in a staggered manner such as to project alternately in the cable insertion opening 130 formed between the side edge of the cover 110 and the side edge of the base 150.

With the projecting length of the first projections 116 being denoted as H1 and the projecting length of the second projections 151 being denoted as H2, the first projections 116 and the second projections 151 are formed such that the sum (i.e., H1+H2) of projecting lengths is longer than a gap length H3 of the cable insertion opening 130 in the Z1-Z2 direction. Namely, the first projections 116 and the second projections 151 extend to such points as to overlap each other in a side elevation view.

Figure 8:
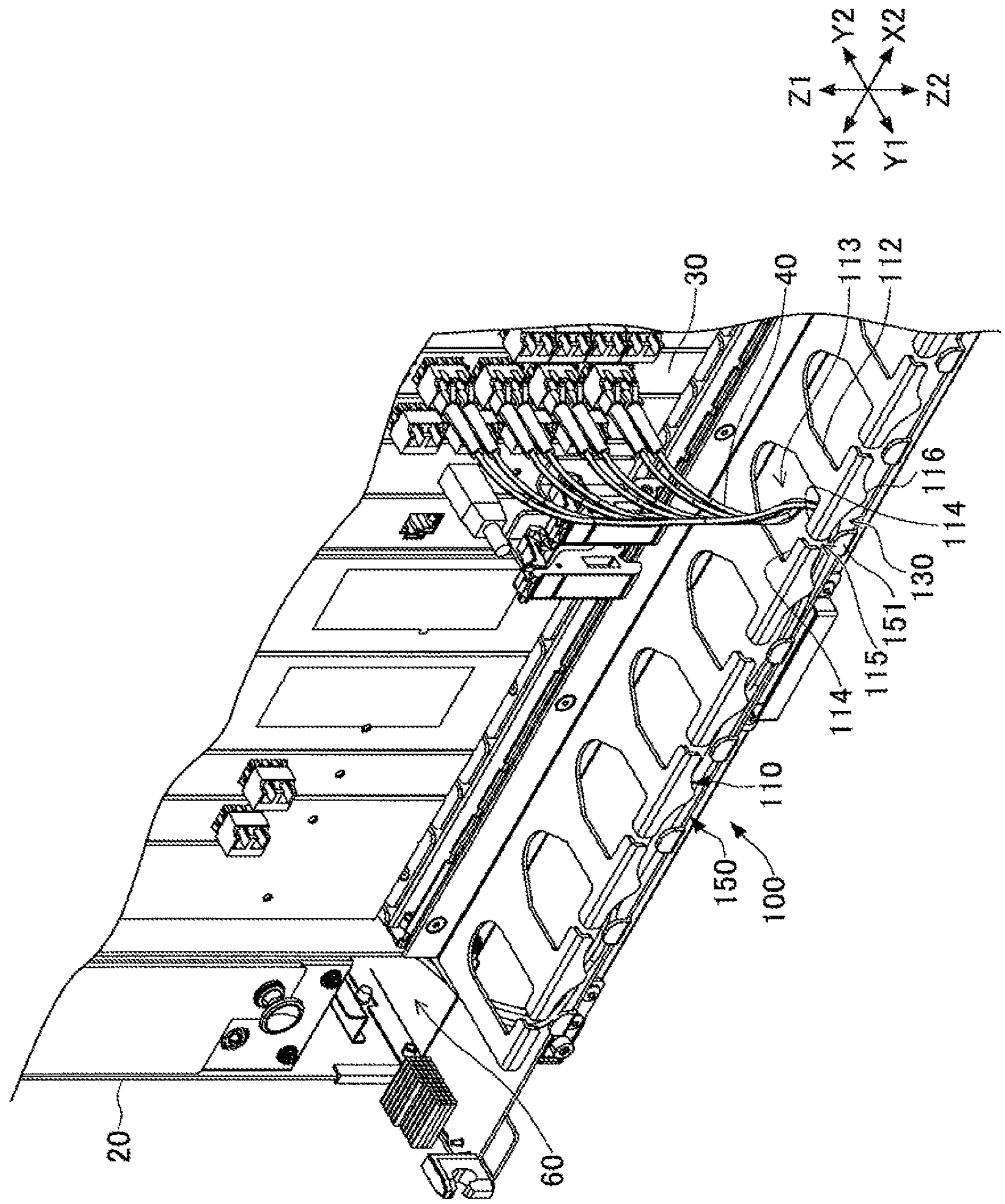
FIG. 8 is a drawing illustrating the way in which cables are enclosed in the cable enclosure of the embodiment.

FIG. 8 is a drawing illustrating the way in which cables are enclosed in the cable enclosure 100 of the present embodiment.

As illustrated in FIG. 8, a middle part the optical cables 40 situated between the placement opening 60 of the shelf 20 and the connectors of the electric packages 30 is enclosed in the cable enclosure 100.

The middle part of the optical cables 40 is inserted into the space between the cover 110 and the base 150 through the cable insertion opening 130 so as to be enclosed in the cable enclosure 100. Portions of the optical cables 40 leading toward the terminals thereof are inserted into the cable extraction opening 113 between the adjacent extending pieces 112 through the communicating opening 115 of the cover 110, so that the terminals are connected to the connectors of the electric packages 30.

The first projections 116 of the cover 110 and the second projections 151 of the base 150 are formed in a staggered manner in the cable insertion opening 130, and extend such as to overlap each other in the Z1-Z2 direction. With this arrangement, the optical cables 40 enclosed in the cable enclosure 100 come in contact with at least one of the first projections 116 and the second projections 151 even when a force is applied in the disengaging direction toward cable insertion opening 130, thereby avoiding easy disengagement.

In the cable enclosure 100 of the present embodiment, the second projections 151 are formed at such positions to face the communicating openings 115, respectively, which connect the cable extraction openings 113 with the cable insertion opening 130. Further, the tip of each of the extending pieces 112 of the cover 110 has the extending portions 114 extending in the X1 direction and the X2 direction, respectively. With this arrangement, the portion of the optical cables 40 toward the terminals thereof, which are connected to the connectors of the electric package 30, is obstructed by the extending portions 114 and the second projection 151, and thus does not easily disengage from the cable extraction opening 113.

In order to enclose the optical cables 40 in the cable enclosure 100, the middle part of the optical cables 40 may simply be bent along the gap between the first projections 116 and the second projections 151 to be inserted through the cable insertion opening 130, which does not lower the efficiency of placement work.

In order to prevent the optical cables 40 from being bent beyond a critical radius of curvature, each of the first projections 116 of the cover 110 has an arc-shaped curvature on both sides. In the cable enclosure 100 of the present embodiment, both sides of each of the first projections 116 have an arc-shaped curvature, such that the cable insertion opening 130 meanders with a larger radius of curvature than a critical radius of curvature of the optical cables 40. This arrangement allows the optical cables 40 to be inserted through the cable insertion opening 130 and enclosed in the cable enclosure 100 without being bent beyond the critical radius of curvature during the placement work.

The optical cables 40 break upon being bent beyond a critical radius of curvature, resulting in the communication apparatus 10 suffering unstable operations and/or showing lower performance. The cable enclosure 100 of the present embodiment, however, allows the placement work to be performed without damaging the optical cables 40, thereby preventing the communication apparatus 10 from suffering unstable operations and exhibiting reduced performance.

As described above, the cable enclosure 100 of the present embodiment has the first projections 116 and the second projections 151 in the cable insertion opening 130, thereby preventing the enclosed optical cables 40 from slipping and disengaging through the cable insertion opening 130. Further, the optical cables 40 can be inserted through the cable insertion opening 130 without being bent beyond a critical radius of curvature, which enables easy placement work.

The configurations (e.g., shape and arrangement) of the first projections 116 and the second projections 151 are not limited to the configurations disclosed in the present embodiment. Further, cables enclosed in the cable enclosure 100 are not limited to the optical cables 40. Although the communication apparatus 10 has been used as an example of the electronic apparatus that has the cable enclosure 100, the electronic apparatus for which the cable enclosure 100 is used is not limited to the communication apparatus 10, and may as well be any electronic apparatus connected to any type of cables.

[Variation]

Figure 9:
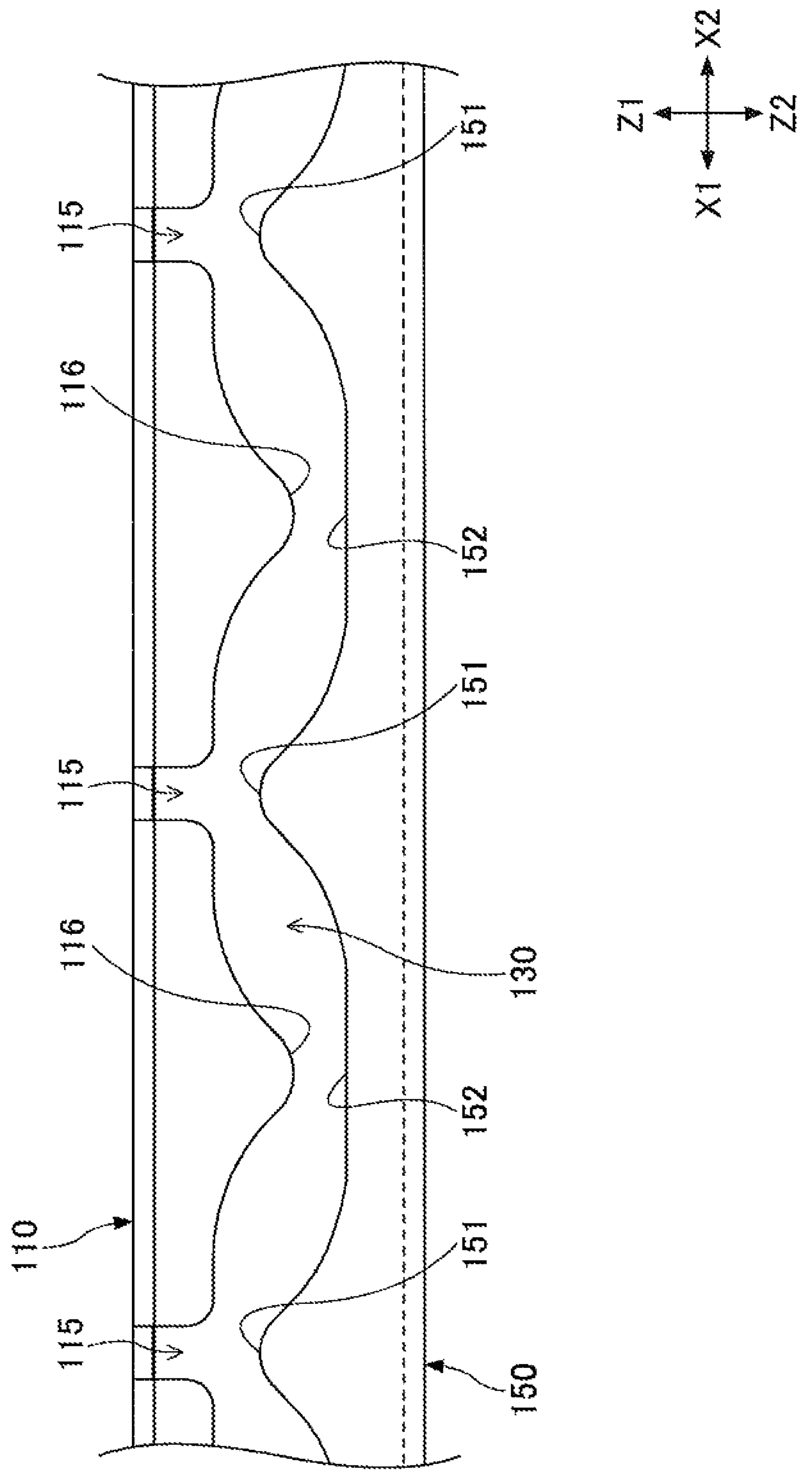
FIG. 9 is a drawing illustrating a variation of the cable enclosure of the embodiment.

In the following, a variation of the cable enclosure 100 of the present embodiment will be described. FIG. 9 is an enlarged view of part of a cable enclosure 100*a* according to the variation.

As illustrated in FIG. 9, the second projections 151 of the base 150 of the cable enclosure 100*a* according to the variation has arc-shaped curvatures extending from the tip on both sides toward the adjacent second projections 151. The provision of the arc-shaped curvatures on both sides of the second projections 151 lowers the possibility of the optical cables 40 being bent beyond a critical radius of curvature during placement work. This arrangement allows the optical cables 40 to be placed without being damaged.

Further, the cable enclosure 100*a* according to the variation has connecting portions 152 that project into the cable insertion opening 130 and extend in the Z1 direction toward the cover 110 from areas between the second projections 151, and that connect the second projections 151 to each other. With the provision of the connecting portions 152 in the cable insertion opening 130, the optical cables 40 enclosed in the cable enclosure 100 has a reduced tendency to disengage through the cable insertion opening 130.

In the cable enclosure 100*a* according to the variation described above, the optical cables 40 have a reduced possibility of being damaged during placement work, and the enclosed optical cables 40 are less likely to disengage through the cable insertion opening 130.

According to at least one embodiment, a cable enclosure is provided that allows cables to be enclosed without disengaging therefrom.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A cable enclosure, comprising:

a base being a solid plate having a continuous straight side edge;

a cover configured to cover the base to allow a cable to be enclosed between the cover and the base; and a cable insertion opening formed between the continuous straight side edge of the solid plate and a side edge of the cover to allow the cable to be inserted therethrough, wherein the cover has a plurality of first projections projecting into the cable insertion opening from the side edge of the cover toward the base, wherein the base has a plurality of second projections projecting into the cable insertion opening from the continuous straight side edge of the solid plate toward the cover, wherein the first projections and the second projections project in a staggered manner, such that a sum of a projecting height of the first projections and a projecting height of the second projections is longer than a gap height of the cable insertion opening, wherein each of the first projections has a convex curved tip and two concave arc-shaped edges situated on both sides of the convex curved tip, wherein the cover has a plurality of flat extending pieces extending in a comb shape, the plurality of flat extending pieces forming cable extraction openings therebetween, and the first projections are formed at tips of the flat extending pieces, and wherein a spacing between adjacent first projections is smaller than a width of the second projections, and a spacing between adjacent second projections is smaller than a width of the first projections so that the first projections overlap with the second projections in a view along a direction perpendicular to the solid plate.

2. The cable enclosure as claimed in claim 1, wherein the flat extending pieces have extending portions extending from the tips, at which the first projections are formed, toward adjacent ones of the extending portions.

3. The cable enclosure as claimed in claim 2, wherein the second projections are situated to face communicating openings, respectively, the communicating openings being formed between the extending portions to connect the cable extraction openings with the cable insertion opening.

4. The cable enclosure as claimed in claim 1, wherein each of the second projections has arc-shaped curvatures extending from a tip thereof toward adjacent ones of the second projections.

5. The cable enclosure as claimed in claim 1, wherein the base has connecting portions projecting into the cable insertion opening toward the cover, the connecting portions connecting between adjacent ones of the second projections.

6. An electronic apparatus, comprising:

the cable enclosure of claim 1.

* * * * *